(12) United States Patent
Cornman et al.

(10) Patent No.: US 10,808,889 B1
(45) Date of Patent: Oct. 20, 2020

(54) GAS TEMPERATURE REDUCING SYSTEM FOR REGULATING DELIVERY OF A HIGH-PRESSURE GAS

(71) Applicant: United States of America as represented by the Secretary of the Navy, Arlington, VA (US)

(72) Inventors: Jacob Cornman, Panama City, FL (US); Brian Toole, Panama City Beach, FL (US); Kirk Vanzandt, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/398,946

(22) Filed: Apr. 30, 2019

(51) Int. Cl.
*F17C 13/04* (2006.01)
*F16K 31/383* (2006.01)

(52) U.S. Cl.
CPC ............ *F17C 13/04* (2013.01); *F16K 31/383* (2013.01); *F17C 2205/035* (2013.01); *F17C 2205/0335* (2013.01); *F17C 2205/0338* (2013.01); *F17C 2205/0388* (2013.01); *F17C 2221/011* (2013.01); *F17C 2260/042* (2013.01); *F17C 2270/025* (2013.01); *Y10T 137/87539* (2015.04); *Y10T 137/87917* (2015.04)

(58) Field of Classification Search
CPC .............. F17C 13/04; F17C 2205/0338; F17C 2205/035; Y10T 137/87917; Y10T 137/8733; Y10T 137/87539; Y10T 137/7762; F16K 31/38; F16K 31/383

USPC ....................................................... 251/30.05
See application file for complete search history.

(56) References Cited

U.S. PATENT DOCUMENTS

| | | | | |
|---|---|---|---|---|
| 3,980,002 A * | 9/1976 | Jarman | .................... | F15B 13/02 91/461 |
| 4,655,240 A * | 4/1987 | Flinchum | ................. | G05D 7/01 137/110 |
| 5,899,434 A * | 5/1999 | Nishimura | ............ | F16K 31/402 251/30.02 |
| 6,021,808 A * | 2/2000 | Dulac | ................... | F24H 9/2035 137/487 |
| 6,962,318 B1 * | 11/2005 | Nugent | ................. | F16K 31/122 137/460 |
| 8,104,264 B2 * | 1/2012 | Abel | ......................... | F02K 9/94 251/30.01 |
| 8,381,760 B2 * | 2/2013 | Santinanavat | ........ | F16K 31/128 137/487.5 |

* cited by examiner

*Primary Examiner* — Kevin F Murphy
(74) *Attorney, Agent, or Firm* — James T. Shepherd

(57) ABSTRACT

A system provides regulated delivery of a high-pressure gas. A first flow path, coupled to a high-pressure gas source, is in fluid communication with a chamber. A flow restrictor, disposed in the first flow path, slows the gas traveling along the first flow path to the chamber. A second flow path, coupled to the high-pressure gas source, is in fluid communication with the chamber. A third flow path connects the chamber to a pressure regulator. A valve, disposed in the second flow path, seals the second flow path when gas pressure at the source exceeds gas pressure in the chamber. The valve opens the second flow path when the gas pressure at the source is balanced with the gas pressure in the chamber allowing the high-pressure gas to flow to the regulator via the third flow path.

10 Claims, 4 Drawing Sheets

GAS TEMPERATURE REDUCING SYSTEM FOR REGULATING DELIVERY OF A HIGH-PRESSURE GAS

ORIGIN OF THE INVENTION

The invention described herein may be manufactured and used by or for the Government of the United States of America for Governmental purposes without payment of any royalties.

FIELD OF THE INVENTION

The invention relates generally to high-pressure gas delivery systems, and more particularly to a system that provides for rapid and regulated delivery of a high-pressure gas such as oxygen while reducing temperature increases associated with "instant on" activation.

BACKGROUND OF THE INVENTION

Breathing apparatus used in underwater operations, hazardous material handling operations, and fire operations typically include a tank of pure oxygen stored at very high pressure (e.g., on the order of 10,000 pounds per square inch gauge or "PSIG"). The oxygen is available for emergency situations. Accordingly, a gas delivery system coupled to the tank provides "instant on" delivery of the oxygen once the delivery system is actuated. However, since the oxygen gas cannot be delivered to a breathing apparatus at the stored high pressure, the oxygen gas must be passed through a pressure or flow regulator to lower the oxygen's gas pressure. The rapid pressure increase (occurring in 0.05 seconds) from ambient pressure to the stored-oxygen gas pressure at the regulator causes the regulator to experience a rapid increase in compression that produces a temperature spike. Unfortunately, regulators typically include non-metallic sealing components that can auto-ignite when subjected to a compression-related temperature spike in the presence of high-pressure oxygen where such auto-ignition can lead to a fire or an explosive event.

SUMMARY OF THE INVENTION

Accordingly, it is an object of the present invention to provide a system that facilitates the pressure regulated delivery of a gas stored at high pressure.

Another object of the present invention is to provide a system that can safely deliver oxygen gas stored at high pressure to a pressure regulator.

Other objects and advantages of the present invention will become more obvious hereinafter in the specification and drawings.

In accordance with the present invention, a system for regulated delivery of a high-pressure gas includes a chamber. A first flow path, coupled to a source of a high-pressure gas, is in fluid communication with the chamber. A flow restrictor, disposed in the first flow path, slows the high-pressure gas traveling along the first flow path to the chamber. A second flow path, coupled to the source of the high-pressure gas, is in fluid communication with the chamber. A third flow path provides fluid communication between the chamber and a pressure regulator. A valve, disposed in the second flow path, seals the second flow path when gas pressure at the source exceeds gas pressure in the chamber. The valve opens the second flow path when the gas pressure at the source is balanced with the gas pressure in the chamber wherein the high-pressure gas flows to the pressure regulator via the third flow path.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
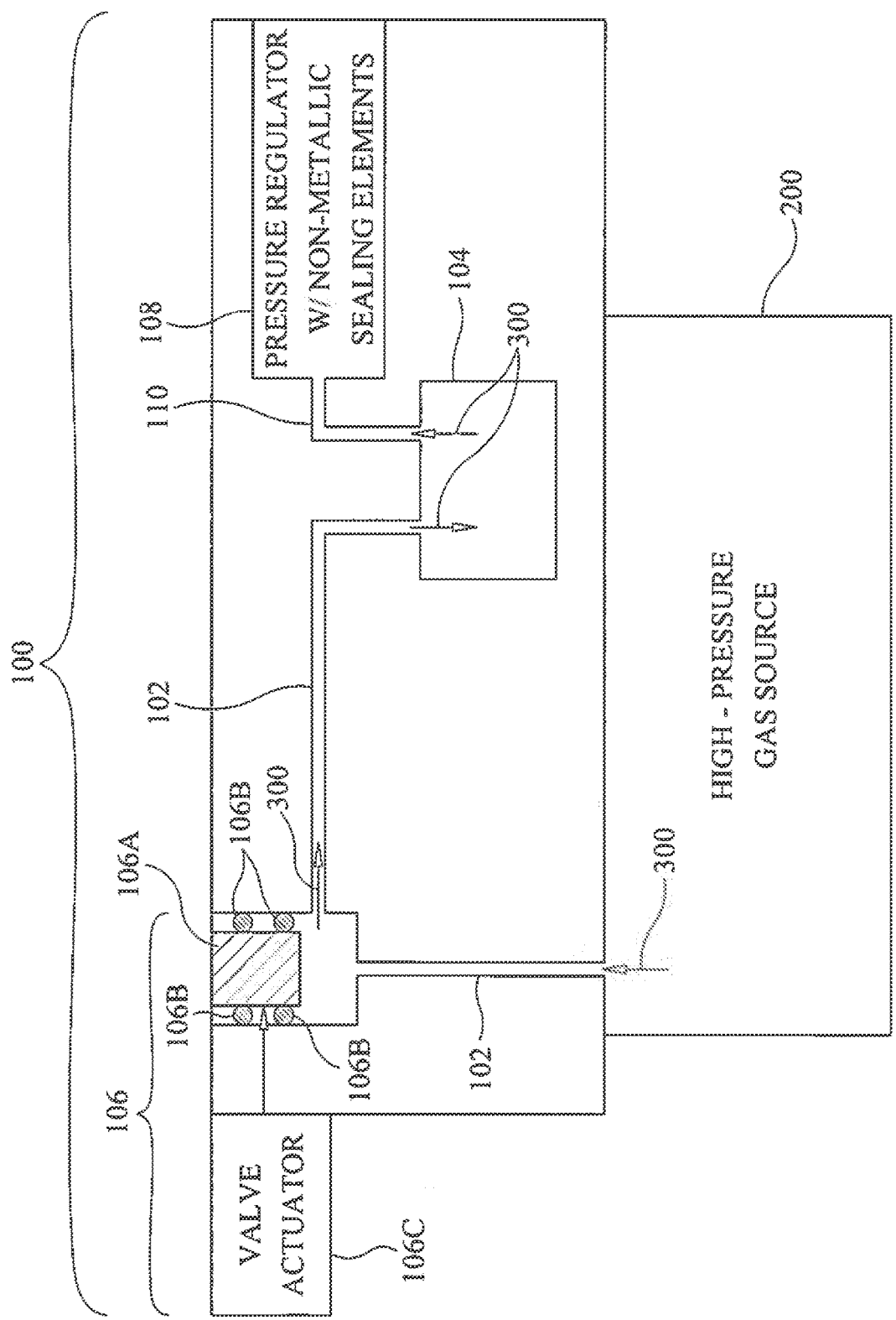
FIG. 1 is a schematic view of a prior art system for controlling the delivery of a high-pressure gas to a pressure regulator.

Before describing the present invention, reference will be made to FIG. 1 where a prior art system for controlling the delivery of a high-pressure gas to the system's pressure regulator is shown and is referenced generally by numeral 100. System 100 is coupled to a source 200 of a gas stored at high pressure. While the gas can be any gas, the gases of greatest concern are those that are subject to auto-ignition in the presence of a temperature spike. By way of an illustrative example, source 200 can be a cylinder or tank storing pure oxygen gas at a high pressure on the order of 10,000 PSIG. Source 200 could also contain a gas mixture that included some oxygen where the higher the oxygen content, the greater the risk of auto-ignition in the presence of a temperature spike. An example of a mixed gas that is treated similar to pure oxygen is a nitrox mixture used in dive applications. In general, nitrox mixtures used in dive applications are enriched nitrogen oxygen mixtures where the oxygen content is greater than that of standard air (e.g., 60% $N_2$/40% $O_2$ or 68% $N_2$/32% $O_2$).

System 100 defines a fluid flow path 102 leading from source 200 to a chamber 104 within system 100. Disposed along flow path 102 is an actuation valve 106 that seals off flow path 102 prior to being activated and opens flow path 102 (as shown) after being activated. Briefly, valve 106 can include a sealing plug 106A, seals 106B, and actuator 106C. Chamber 104 is in fluidic communication with a pressure regulator 108 via a fluid flow path 110. As is known in the art, pressure regulator 108 typically includes one or more non-metallic sealing elements that can auto-ignite at high temperature.

Prior to activation, actuator 106C retains sealing plug 106A in a position that seals flow path 102. During this time, the high-pressure gas 300 stored at source 200 is blocked by actuation valve 106 such that the pressure in chamber 104 is at ambient pressure. As soon as actuator 106C is engaged by a user, sealing plug 106A is no longer constrained (as shown) and high-pressure gas 300 is in chamber 104 and at regulator 108 in approximately 0.05 seconds causing a dangerous rapid temperature increase at regulator 108.

The present invention eliminates the above-described rapid temperature increase at the regulator by increasing the time it takes for pressure to build up at the regulator to 1-2 seconds between system activation and gas delivery to the regulator. The short time increase is insignificant in terms of the system's "instant on" capability, while being sufficient to prevent the above-described rapid temperature increase at the regulator.

Figure 2:
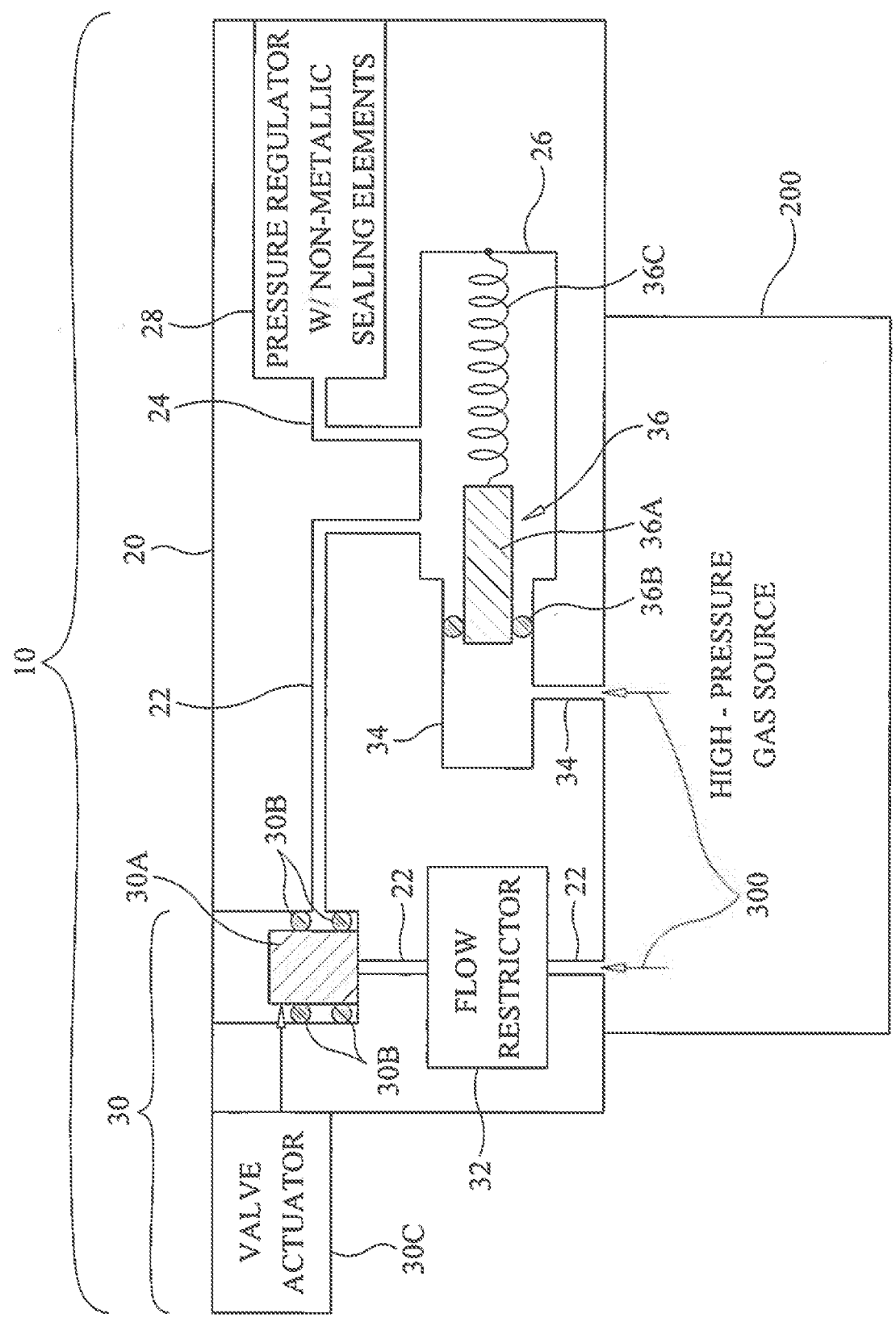
FIG. 2 is a schematic view of a system for controlling the delivery of a high-pressure gas to a pressure regulator in accordance with an embodiment of the present invention with the system being illustrated in its pre-activated state.
Figure 3:
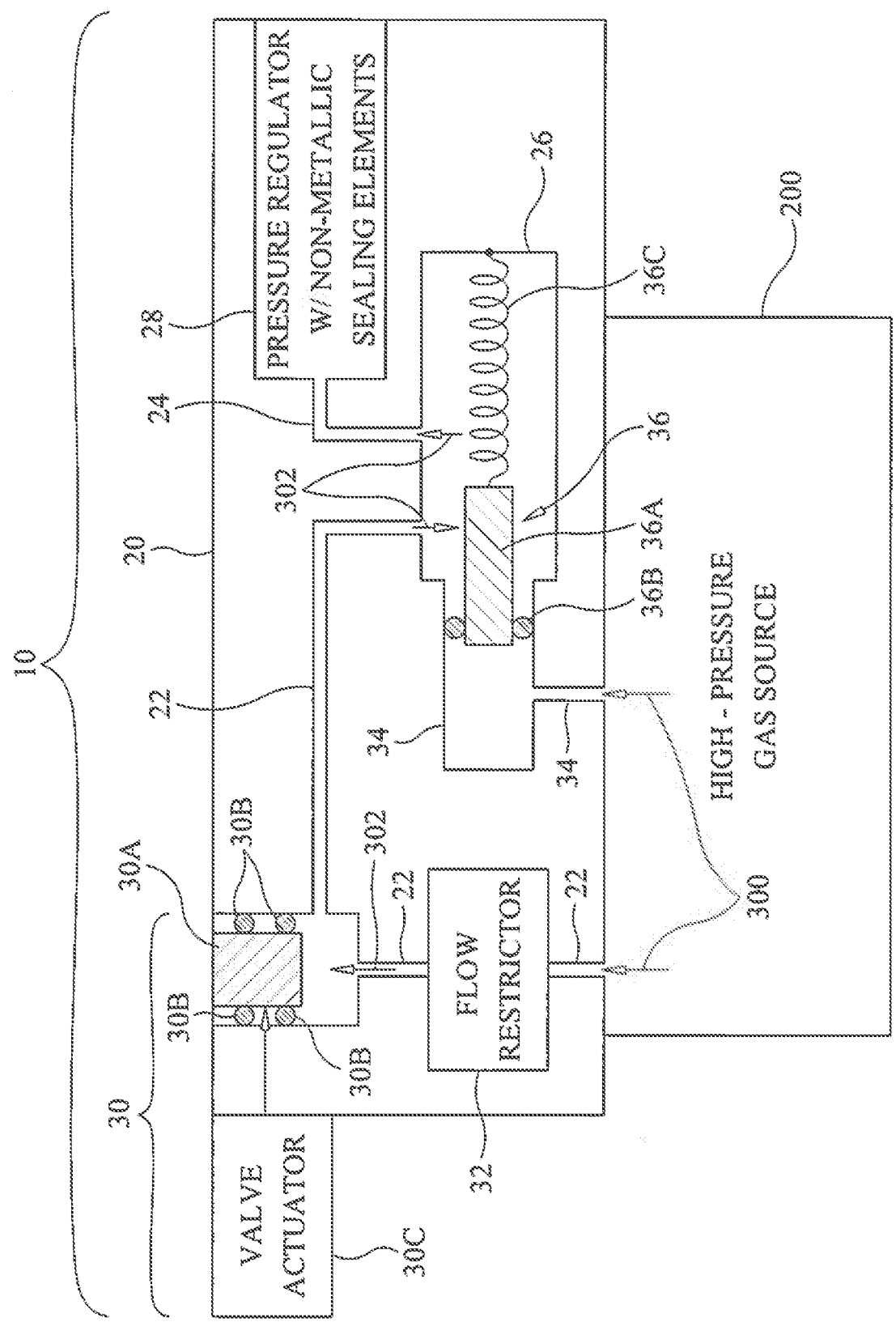
FIG. 3 is a schematic view of the system illustrated in FIG. 2 in its transient state immediately after system activation.
Figure 4:
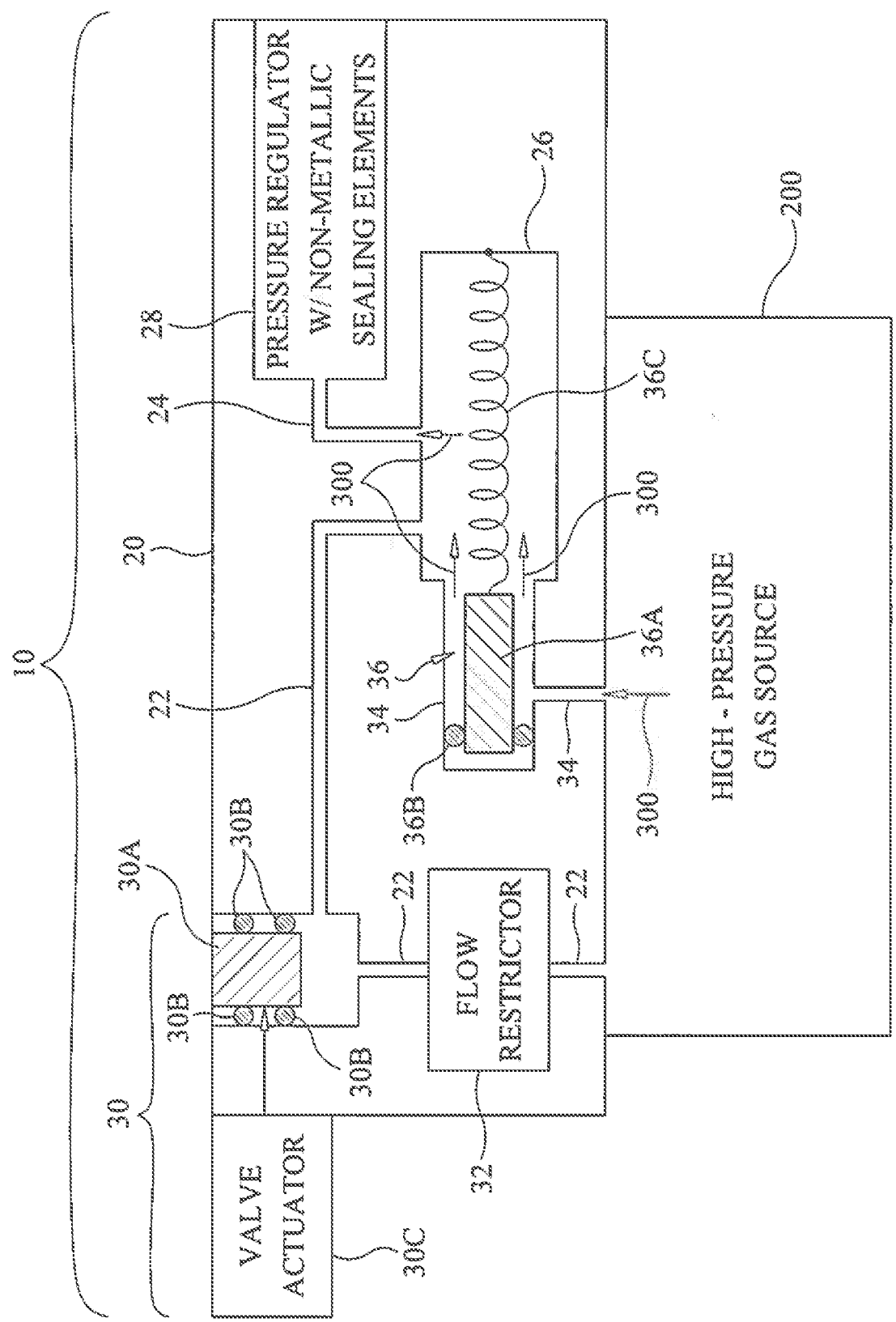
FIG. 4 is a schematic view of the system illustrated in FIG. 2 in its steady state after completion of the system's transient state.

The system of the present invention will now be described with simultaneous reference to FIGS. 2-4 where the system of the present invention is shown in its various states of operation and is referenced generally by numeral 10. Briefly, FIG. 2 illustrates system 10 prior to its activation, FIG. 3 illustrates system 10 in its transient state immediately after activation, and FIG. 4 illustrates system 10 in its steady-state condition that follows the system's transient state. As with the prior art system, system 10 is coupled to source 200 of high-pressure gas 300 such as oxygen gas.

System 10 can be completely contained within a housing 20 defining or supporting fluid flow paths 22 and 24 that are analogous to the above-described flow paths 102 and 110, respectively. That is, flow path 22 leads from source 200 to a chamber 26 within housing 20, and flow path 24 leads from chamber 26 to a pressure regulator 28 that is analogous to the above-described pressure regulator 108 such that pressure regulator 28 can include non-metallic components subject to auto-ignition at high temperatures.

Similar to the above-described system 100, system 10 includes an actuation valve 30 that seals off flow path 22 prior to activation (FIG. 2), and opens flow path 22 after being engaged/activated (FIGS. 3 and 4). By way of an illustrative example, valve 30 can include a sealing plug 30A, seals 30B, and a manually-operated actuator 30C (e.g., pull pin, knob, etc.), each of which is analogous to the above-described elements 106A-106C, respectively.

The elements of system 10 that slow the rapid pressure build-up at regulator 28 include a flow restrictor 32, and a fluid flow path 34 having a delay valve 36 disposed in flow path 34. Flow restrictor 32 is any fluid-flow-controlling element that delays or slows the movement of fluid moving through it. For example, flow restrictor 32 could be realized by an orifice fitting, a restrictor plate, a valve, a filter or other porous medium, etc.

Flow path 34 can be defined within housing 20 to provide fluid communication between source 200 and chamber 26. Delay valve 36 is disposed in flow path 34. In general, delay valve 36 is configured to seal off flow path 34 between source 200 and chamber 26 when the gas pressure at source 200 exceeds the gas pressure in chamber 26 (FIGS. 2 and 3), and open flow path 34 between source 200 and chamber 26 when there is a pressure balance between source 200 and chamber 26 (FIG. 4). The present invention provides a short transient state (FIG. 3) to slow the pressure build up in chamber 26 and, therefore, the pressure build up at regulator 28 to eliminate a compression-related temperature spike at regulator 28.

In the illustrated embodiment, delay valve 36 includes a sealing plug 36A, seals 36B cooperating between plug 36A and flow path 34, and a biasing compression spring 36C. Prior to activation (FIG. 2), flow path 22 is sealed by actuation valve 30. Flow path 34 is sealed by delay valve 36 as high-pressure gas 300 acts on one side of plug 36A, while a biasing spring force provided by spring 36C acts on the other side of plug 36A. In this state, the pressure in chamber 26 is at ambient pressure.

When actuation valve 30 is engaged/activated by a user, system 10 enters its short-duration (e.g., 1-2 seconds long) transient stage illustrated in FIG. 3. During this time, high-pressure gas 300 flows through flow restrictor 32 causing movement of sealing plug 30A to fully open flow path 22 to chamber 26. Flow restrictor 32 slows the movement of high-pressure gas 300 so that the time it takes for the pressure in chamber 26 to increase to that of high-pressure gas 300 increases by 1-2 seconds as compared to a system having no flow restrictor 32. The slowed-movement gas is indicated by flow arrow 302 in FIG. 3. During this transient time, the pressure of gas 302 is building but is still less than that of high-pressure gas 300 originating from source 200. This pressure difference keeps flow path 34 sealed by delay valve 36 such that regulator 28 only receives the building pressure associated with gas 302. In this way, regulator 28 does not experience a compression-related temperature spike.

At the conclusion of the above-described transient stage, the pressure of gas 300 from source 200 entering flow path 34 equalizes to that of gas 302 building in chamber 26 via flow path 22. When this occurs, the resulting pressure balance between chamber 26 and flow path 34 (coupled to source 200) permits the force of compression spring 36C to open delay valve 36 such that high-pressure gas 300 flows into chamber 26 via flow path 34 and is provided to regulator 28, as illustrated in FIG. 4.

The advantages of the present invention are numerous. By slowing the build-up of high pressure at a gas delivery system's pressure regulator, the regulator does not experience a compression-related temperature spike that can lead to system failure. The brief-duration transient stage introduced by the present invention greatly improves gas delivery safety without any significant impact on the system's "instant on" capabilities needed for emergency situations.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for regulated delivery of a high-pressure gas, comprising:
   a chamber;
   a first flow path adapted to be coupled to a source of a high-pressure gas, said first flow path in fluid communication with said chamber;
   a flow restrictor disposed in said first flow path for slowing the high-pressure gas traveling along said first flow path to said chamber;
   a second flow path adapted to be coupled to the source of the high-pressure gas, said second flow path in fluid communication with said chamber;
   a pressure regulator;
   a third flow path providing fluid communication between said chamber and said pressure regulator; and
   a valve disposed in said second flow path, said valve sealing said second flow path when gas pressure at the source exceeds gas pressure in said chamber, and said valve opening said second flow path when the gas pressure at the source is balanced with the gas pressure in said chamber wherein the high-pressure gas flows to said pressure regulator via said third flow path.

2. A system as in claim 1, wherein said pressure regulator includes non-metallic materials.

3. A system as in claim 1, wherein said valve comprises a spring-loaded valve.

4. A system as in claim 1, further comprising an actuation valve disposed in said first flow path between said flow restrictor and said chamber, wherein the high-pressure gas flows through said flow restrictor only when said actuation valve is opened.

5. A system for regulated delivery of a high-pressure gas, comprising:
- a housing adapted to be coupled to a source of a high-pressure gas;
- a chamber disposed within said housing;
- a first flow path in said housing leading from the source of the high-pressure gas to said chamber;
- a flow restrictor disposed in said first flow path;
- an actuation valve disposed in said first flow path between said flow restrictor and said chamber, wherein the high-pressure gas flows through said flow restrictor only when said actuation valve is opened and wherein said flow restrictor slows the high-pressure gas passing there through;
- a second flow path in said housing leading from the source of the high-pressure gas to said chamber;
- a pressure regulator disposed in said housing;
- a third flow path in said housing providing fluid communication between said chamber and said pressure regulator; and
- a valve disposed in said second flow path, said valve sealing said second flow path when gas pressure at the source exceeds gas pressure in said chamber, and said valve opening said second flow path when the gas pressure at the source is balanced with the gas pressure in said chamber wherein the high-pressure gas flows to said pressure regulator via said third flow path.

6. A system as in claim 5, wherein said pressure regulator includes non-metallic materials.

7. A system as in claim 5, wherein said valve comprises a spring-loaded valve.

8. A system for regulated delivery of pressurized oxygen gas, comprising:
- a chamber;
- a first flow path adapted to be coupled to a source of pressurized oxygen gas, said first flow path providing for transport of the pressurized oxygen gas from the source to said chamber;
- a flow restrictor disposed in said first flow path for slowing the pressurized oxygen gas transported along said first flow path to said chamber;
- a second flow path adapted to be coupled to the source of the pressurized oxygen gas, said second flow path providing for transport of the pressurized oxygen gas from the source to said chamber;
- a pressure regulator made at least partly from non-metallic materials;
- a third flow path providing fluid communication between said chamber and said pressure regulator; and
- a valve disposed in said second flow path, said valve sealing said second flow path when gas pressure at the source exceeds gas pressure in said chamber, and said valve opening said second flow path when the gas pressure at the source is balanced with the gas pressure in said chamber wherein the high-pressure gas flows to said pressure regulator via said third flow path.

9. A system as in claim 8, wherein said valve comprises a spring-loaded valve.

10. A system as in claim 8, further comprising an actuation valve disposed in said first flow path between said flow restrictor and said chamber, wherein the pressurized oxygen gas flows through said flow restrictor only when said actuation valve is opened.

\* \* \* \* \*